United States Patent [19]

Hall

[11] 4,269,142
[45] May 26, 1981

[54] AQUARIUM

[76] Inventor: Richard C. Hall, 3828 17th Ave. S., Minneapolis, Minn. 55407

[21] Appl. No.: 66,529

[22] Filed: Aug. 15, 1979

[51] Int. Cl.³ .............................................. A01K 64/00
[52] U.S. Cl. ........................................................ 119/5
[58] Field of Search ............................................ 119/5

[56] References Cited

U.S. PATENT DOCUMENTS

| | | | |
|---|---|---|---|
| D. 48,108 | 11/1915 | Halterbeck | 119/5 X |
| 1,991,683 | 2/1935 | Kelly | 119/5 |
| 3,101,564 | 8/1963 | Stoessel | 119/5 X |
| 3,119,371 | 1/1964 | Zuckerman | 119/5 |
| 3,121,417 | 2/1964 | Goldman et al. | 119/5 |
| 3,326,185 | 6/1967 | Perez | 119/5 |
| 3,763,997 | 10/1973 | Willinger et al. | 119/5 X |
| 3,998,242 | 12/1976 | Goldman et al. | 119/5 X |
| 4,078,522 | 3/1978 | Akers | 119/5 |
| 4,160,427 | 7/1979 | Holbrook | 119/5 |

FOREIGN PATENT DOCUMENTS 1168727 10/1969 United Kingdom .................. 119/5

*Primary Examiner*—Robert Peshock
*Assistant Examiner*—Robert P. Swiatek
*Attorney, Agent, or Firm*—Wayne B. Easton

[57] ABSTRACT

The invention relates to an aquarium designed to simulate a television set for aesthetic reasons. The invention involves providing an aquarium assembly having a one piece frame member with a floor section and four vertical wall sections including a front wall section. All of the wall sections of the frame member have openings and transparent sheet material for covering the openings are attached to the inside of the wall sections in fluid sealing relation. Decorator panels for selected ones of the openings other than the opening of the front wall section are provided having respectively the same sizes as the selected openings and are attachable as covers for the selected openings by press fitting from the exteriors of the three vertical wall sections. The aquarium has a hood and the decorator panels have external coverings which harmonize with the external coverings of the frame member and the hood. The panels have aesthetically choosen internal coverings which produce a desired visual effect when viewed through the opening of the front wall. In the front part of the aquarium, for viewing purposes, is a bubble bar tank having closely spaced side walls of a transparent material. A perforated tube in the bubble bar tank extends horizontally along the bottom thereof and has a series of air outlet ports. An air feeding tube is connected to the bubble tube for supplying pressurized air thereto. Air escaping from the bubble bar outlet ports bubbles up through the liquid in the bubble bar tank to produce a desired viewing effect.

4 Claims, 9 Drawing Figures

AQUARIUM

The invention relates to an aquarium having new and improved constructional features which produce desirable visual effects.

The primary purpose of an aquarium is to permit a view of aquatic life which provides enjoyment to the viewer. In order to enhance this enjoyment it has been the practice to provide aesthetic surroundings such as colored aggregate or pebbles and a wide range of statuary and other objects for the aquarium.

An aquarium as disclosed herein is designed to simulate a television set for aesthetic reasons, but such motif is not essential to the invention.

A main object of the invention is to provide a new and improved aquarium having certain constructional features which produce desired aesthetic effects.

Other objects and advantages of the invention will become apparent in the following specification, appended claims and attached drawings.

Figure 1:
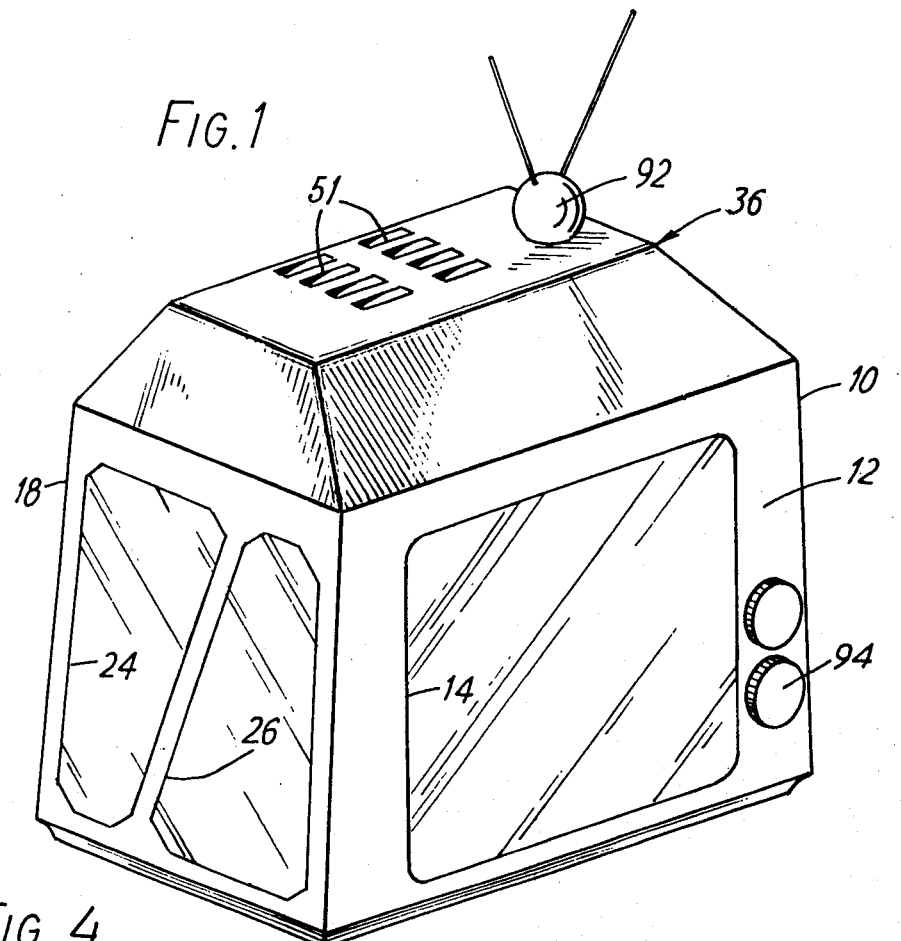
FIG. 1 is a perspective view of an aquarium embodying the invention.
Figure 4:
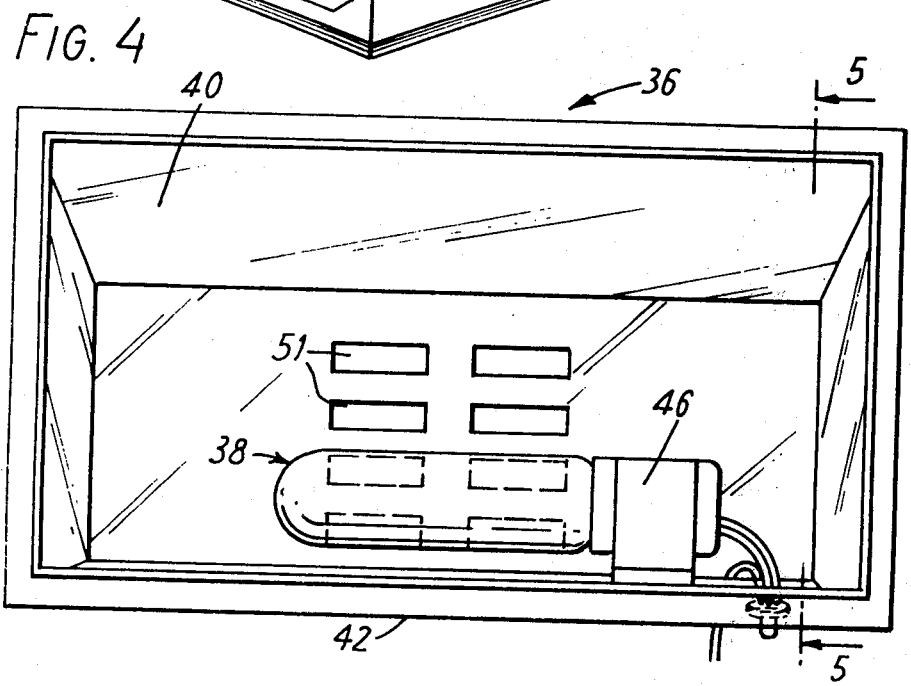
FIG. 4 is a bottom view of the hood of the aquarium.
Figure 2:
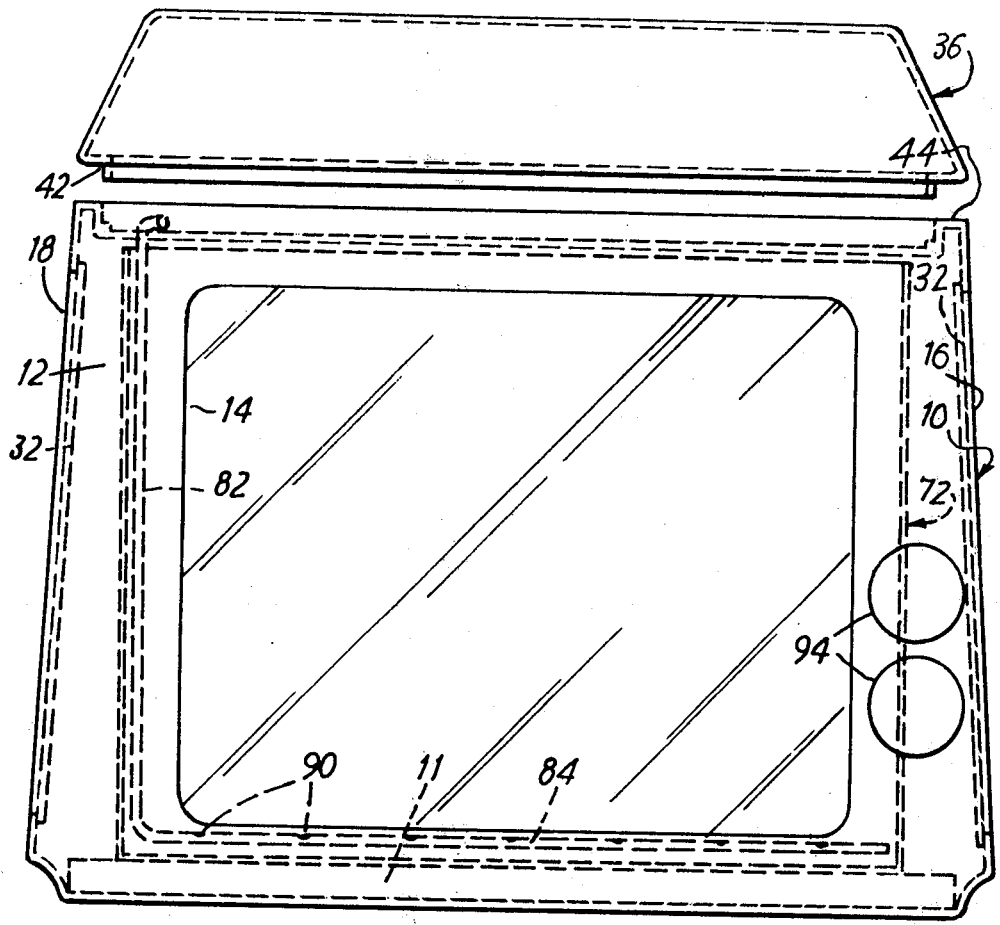
FIG. 2 is a front view of the aquarium of FIG. 1 with the hood thereof removed to illustrate the joining construction.
Figure 5:
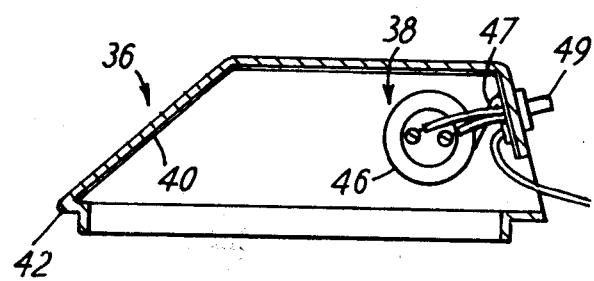
FIG. 5 is a sectional view of the aquarium hood taken on line 5—5 of FIG. 4.
Figure 3:
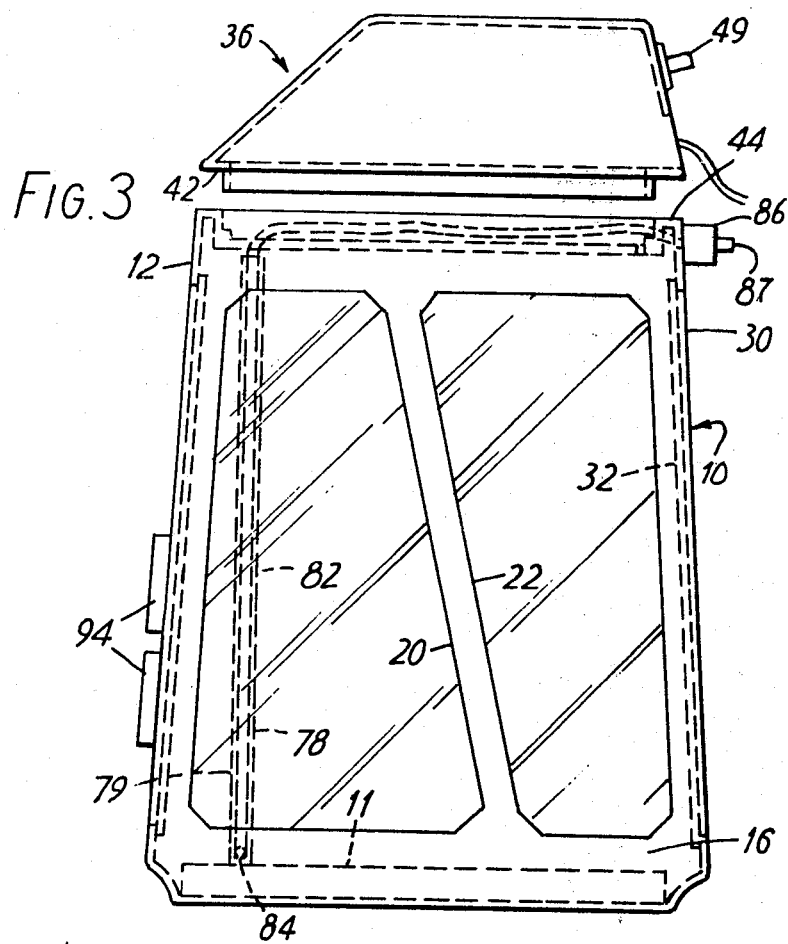
FIG. 3 is a side view of the aquarium shown in FIGS. 1 and 2.

Referring to the drawings, the aquarium, as indicated in FIGS. 1, 2 and 3, may have a one piece molded frame 10 made of a plastic material or the like. The frame comprises, generally, a floor section 11 and four vertically extending sides or walls. The front side 12 of the frame has a rectangularly shaped opening 14 through which the interior of the aquarium may be viewed and, when fitted with a sheet of plexiglass or the like, simulates a TV viewing screen. The right and left sides 16 and 18 of the frame 10 have rectangularly shaped openings which are not shown.

The inner sides of the four vertical sides 12, 16, 18 and 30 of the frame 10 have four sheets 32 of clear plexiglass attached or cemented thereto which cover the openings in the sides and which provide, in conjunction with the sides and the floor section 11, a tank for holding water that constitutes an aquarium.

A cover 36 as shown in FIGS. 1 to 5 is provided for the aquarium which is hood shaped and may be provided with a lamp assembly 38 and may be lined with a reflector plate or reflective material 40. The cover 36 has a rabbet type lower edge or periphery 42 which matches a rabbet type upper edge or periphery 44 of the tank frame 10 to form a rabbet type joint so that the cover fits snugly on the frame 10 as indicated in FIG. 1.

The lamp assembly 38 includes a lamp socket 46 mounted in the cover 36 with a bracket 47 and a switch unit 49 for controlling the lamp assembly. The cover has louvers 51 for dissipating heat generated by the lamp assembly 38.

A screen member (not shown) is preferably provided for the top of the frame 10, and under the cover 36, to prevent certain types of aquatic animals that may inhabit the aquarium from escaping, and at other times when the cover unit 36 has been taken off for one reason or another.

Figure 6:
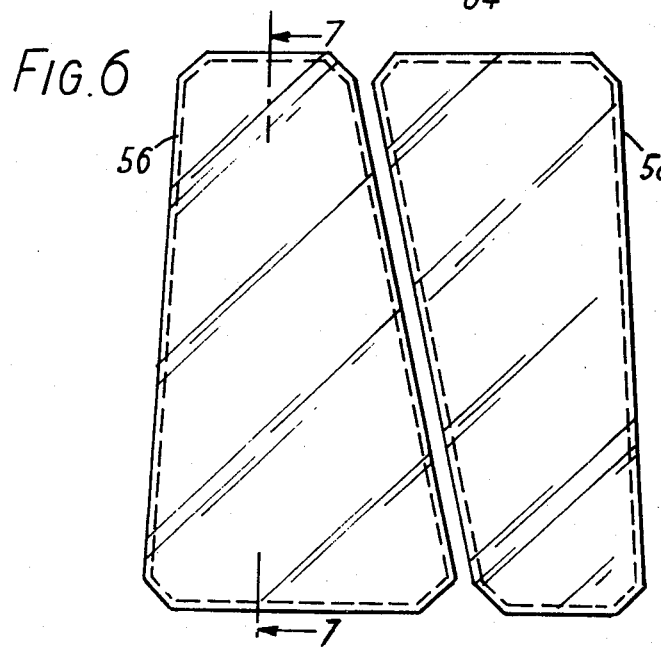
FIG. 6 is a side view of decorator panels which are attachable to the side walls of the aquarium.
Figure 7:
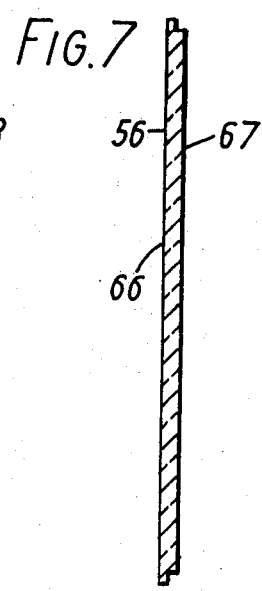
FIG. 7 is a vertical sectional view taken on line 6—6 of FIG. 6.

Referring to FIGS. 6 and 7, there are shown decorator panels 56 and 58 having the same size as the openings 24 and 26 of frame side member 18 and which are adapted to be inserted in and held in such openings. The panels 56 and 58 have rabbet type edges, as shown, which match the openings 24 and 26 to facilitate their easy attachment to and removal from the frame side member 18.

The right side member 16 of the frame 10 is in the same manner provided with similar decorator panels (not shown) and the rear side member 30 has an opening (not shown) as mentioned above. A decorator panel (not shown) similar in nature to the panels 56 and 58, except as to size and shape, is provided for the rear side member 30.

Referring to FIG. 7, the decorator panel 56 has on its outer side 66 a covering which may be the same as or harmonize with the exterior covering of the frame 10 and the cover 36. The inner side 67 of the panel 56 is provided with an appropriate design, mirror surface or picture, which will be visible through the clear window of the front opening 14 and which will give a particular aesthetic effect as desired. The other panels referred to above for the side member 16 and the rear side member 30 are provided in the same manner as panels 56 and 58. Together these panels constitute a unitary set of decorator panels with the inner sides thereof combining to form a composite overall design or depict an aesthetic scene having a theme or subject which is appropriate for viewing in the environment of an aquarium.

In the merchandising of the aquarium there may be offered sets of decorator panels having different designs and scenes such that a purchaser may choose a set having a design or scene he prefers or he may purchase more than one set of panels so that he may change sets from time-to-time to achieve different effects from his aquarium. The ease with which the panels may be attached and removed from the sides of the frame 10 facilitates frequent and effortless changing of sets as desired.

Figure 8:
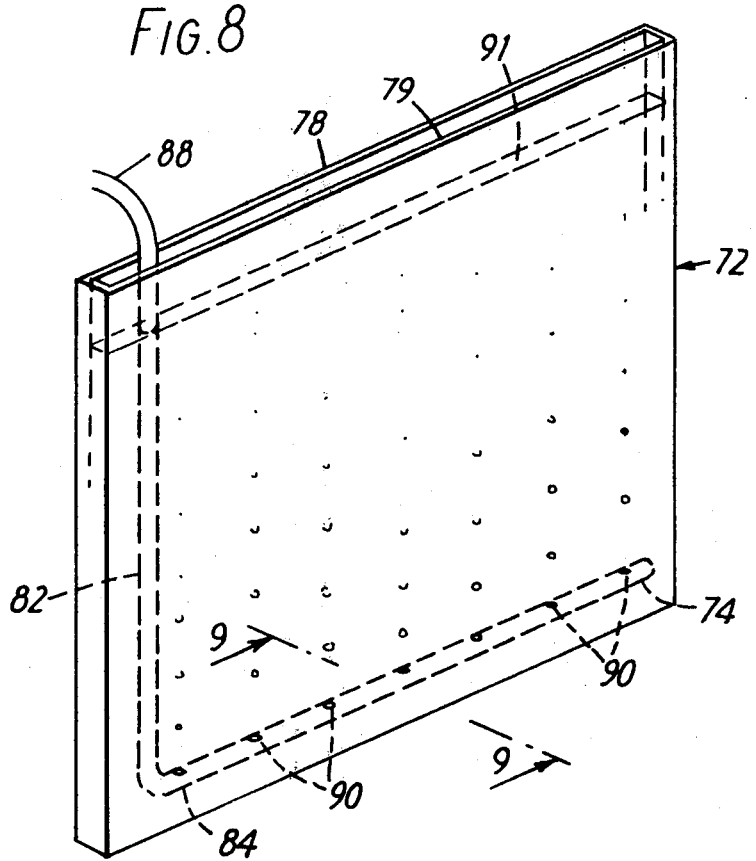
FIG. 8 is a perspective view of a bubble bar tank assembly which is mountable in the aquarium adjacent the front wall thereof.
Figure 9:
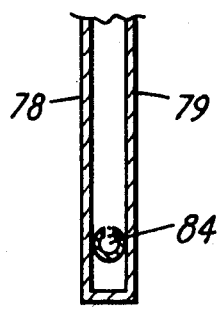
FIG. 9 is a vertical sectional view taken on line 9—9 of FIG. 8.

Referring to FIGS. 8 and 9, there is shown a bubble bar screen assembly which comprises an elongated and very narrow receptacle 72 and a bubble bar unit 74. The bubble bar screen assembly is shown installed by means not shown in the aquarium in FIGS. 2 and 3.

Receptacle 72 comprises two sheets 78 and 79 of a transparent plexiglass or the like spaced apart on the order of 3/16 inch by strip-like end and floor sections. Receptacle 72 may be either open or closed at the top as desired.

The bubble bar unit 74 is an L-shaped tube unit of a rigid plastic with a vertical section 82 and a lower horizontal section 84. As seen in FIGS. 3, a manifold type box 86 having a compressed air fitting 87 as an inlet is attached to the rear of the aquarium. A flexible hose 88 extends from the bubble bar vertical section 82 to the box 86.

Bubble bar horizontal section 84 has a series of air outlet ports 90 extending in spaced relation at the top and across the length thereof. The receptacle 72 is filled with a liquid 91 such as water and may be either clear or colored.

Air supplied through box 86 and tube 88 flows through bubble bar sections 82 and 84 and, upon escaping through ports 90, rises or bubbles up through the liquid 91 in receptacle 72 to give a pleasant and unusual visual effect through the front aquarium opening 14. Some kind of venting should be provided for air bubbles rising through the liquid 91 if a closed top (not shown) is provided for the receptacle 72.

It is desirable that the bubble bar horizontal section 84 be covered to a height of about one inch with colored aggregates or pebbles (not shown) to not only hide the bar section 84 from view but to also achieve a unique visual effect wherein the air from the bubble bar 84 causes the pebbles to dance around. For this reason the specific weight or gravity of the pebbles and the liquid in the receptacle 72 may be varied within wide limits to achieve certain desired effects. A very light weight pebble combined with a relatively heavy liquid in the receptacle 72 would produce a "slow motion" movement for the pebbles whereas the opposite limits would produce a very rapid dancing of the pebbles.

The bubble effect of the rising bubbles and the dancing pebbles in combination with viewing the aquatic life in the aquarium and the designs or scenes on the inner sides of the decorator panels, and the lighting effect from the reflector cover lamp assembly 38, all combine to give an overall viewing effect which is delightful to the viewer.

A valve (not shown) could be provided for the manifold box 86 so that the rate of bubbling from the bubble bar can be controlled as desired, from air which is supplied from an aquarium pump. The manifold box 86 could also be utilized to service other requirements of the aquarium for air such as an aerating unit for aerating the water in the aquarium.

The television motif of the aquarium may be further carried out by providing a pseudo antenna 92 and pseudo control knobs 94 as shown in FIG. 1.

What is claimed is:

1. An aquarium assembly, comprising, a one piece frame member having a floor section and four vertical wall sections including a front wall section, said wall sections having openings, transparent sheet material for covering said openings being attached to the inside of said wall sections in fluid sealing relation thereto, decorator panels for selected ones of said openings of said vertical wall sections other than said front wall section, said panels being respectively the same sizes as said selected openings and attachable as covers for said selected openings by press fitting from the exteriors of said three vertical wall sections, a hood for said aquarium, said panels having external coverings which harmonize with the external coverings of said frame member and said hood, said panels having aesthetically chosen internal coverings which produce a desired visual effect when viewed through said opening of said front wall section, a bubble bar receptacle having closely spaced side walls of a transparent material, said receptacle being installed in said tank in parallel and closely spaced relation to said front wall section of said tank, a perforated bubble tube in said receptacle extending horizontally along the bottom thereof, said bubble tube having a series of air outlet ports extending in spaced relation at the top and across the length thereof, an air feeding tube in said receptacle connected to said bubble tube and extending vertically in closely spaced relation to one end of said receptacle, an air inlet fitting attached to the top of said tank, tube means between said air feeding tube and said air inlet fitting, and a liquid in said receptacle through which air bubbles from said bubble tube may rise to produce a desired viewing effect.

2. An aquarium assembly according to claim 1 wherein said liquid in said receptacle is colored.

3. An aquarium assembly according to claim 1 wherein said liquid has a specific gravity different than water.

4. An aquarium assembly according to claim 1 wherein said bubble tube is covered with a layer of pebbles of a desired specific weight so that air escaping from said ports causes movement of said pebbles.

* * * * *